July 15, 1952 T. C. RIEBE 2,603,719

COMBINED WALL AND DESK TELEPHONE SET

Filed Sept. 13, 1950 5 Sheets-Sheet 1

INVENTOR.
THEODORE C. RIEBE

BY Chas. L. Candy

ATTORNEY

July 15, 1952 T. C. RIEBE 2,603,719

COMBINED WALL AND DESK TELEPHONE SET

Filed Sept. 13, 1950 5 Sheets-Sheet 2

INVENTOR.
THEODORE C. RIEBE

BY [signature]

ATTORNEY

July 15, 1952 T. C. RIEBE 2,603,719

COMBINED WALL AND DESK TELEPHONE SET

Filed Sept. 13, 1950 5 Sheets-Sheet 3

INVENTOR.
THEODORE C. RIEBE

BY Chas. W. Candy

ATTORNEY

COMBINED WALL AND DESK TELEPHONE SET

Filed Sept. 13, 1950 5 Sheets-Sheet 4

*INVENTOR.*
THEODORE C. RIEBE

*BY*

ATTORNEY

July 15, 1952 T. C. RIEBE 2,603,719

COMBINED WALL AND DESK TELEPHONE SET

Filed Sept. 13, 1950 5 Sheets-Sheet 5

*INVENTOR.*
THEODORE C. RIEBE

*BY*

ATTORNEY

Patented July 15, 1952 2,603,719

UNITED STATES PATENT OFFICE 2,603,719

COMBINED WALL AND DESK TELEPHONE SET

Theodore C. Riebe, Chicago, Ill., assignor to Automatic Electric Laboratories, Inc., Chicago, Ill., a corporation of Delaware Application September 13, 1950, Serial No. 184,585

6 Claims. (Cl. 179—100)

This invention relates in general to telephone instruments and more particularly to a telephone instrument of the combination desk or table mounting type and wall mounting type.

One object of this invention is to provide an attractive, compact desk mounting telephone set whereof the handset will tend to move or guide itself into its normal resting position on the base thereof due to the action of gravity on the handset after being placed in approximately the normal position on the base.

Another object of this invention is to provide a desk mounting telephone set whereof the handset will tend to guide itself into its normal resting position on the base thereof due to the action of gravity on the handset after being placed in approximately the normal position on the base and whereof the handset in moving from the approximately normal resting position into which it has been placed by the user to the normal position responsive to gravity locks itself into the normal position and also operates the telephone hookswitch.

The invention will appear more clearly, and further objects will become apparent, from the following detailed description when taken in connection with the accompanying drawings, showing by way of example, a preferred embodiment of the inventive idea.

Figure 11:
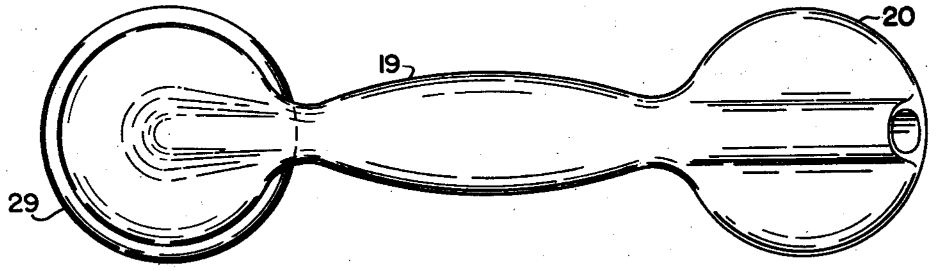
Figure 12:
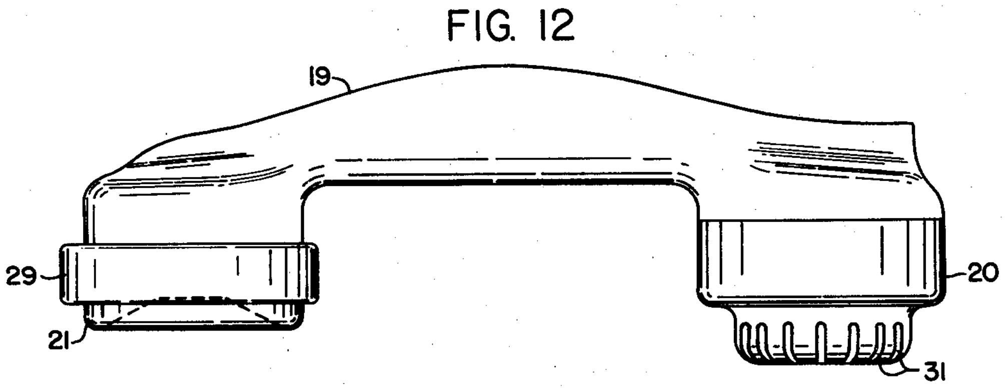
Figure 13:
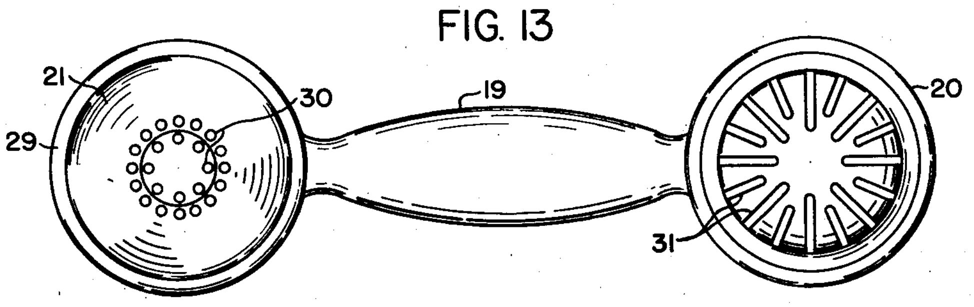

Figs. 11, 12, and 13 are different views of the handset which rests on the base.

Figure 14:
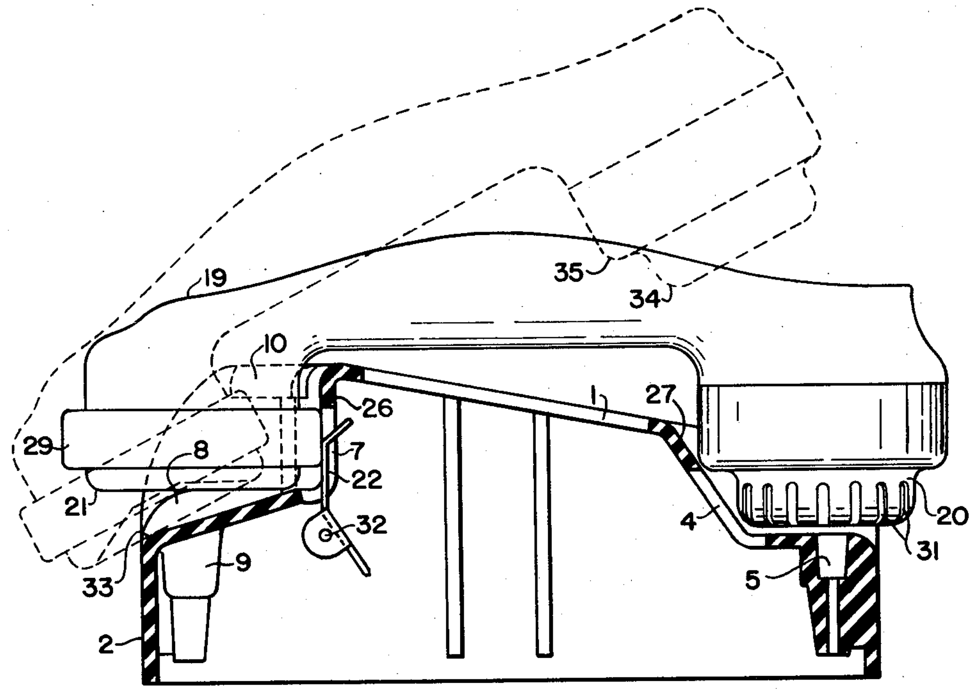

Fig. 14 shows the base with the handset mounted thereon in its normal resting position (solid lines). The dotted line handset illustrates the handset in a position in which a telephone subscriber may release his hold on the handset when replacing it on the base.

Referring now to Figs. 1, 2, 3, 4, 10, and 14, the base 2 of this telephone set is of the hard surfaced, one piece moulded type construction which is common in the art. The base is generally rectangular in shape when viewed from the top with the exposed edges curved and rounded rather than square. The base is shorter than the handset which is held thereon, the handset ends protruding over both ends of the base, and is wider than the handset. The base 2 is formed so as to have an opening 1 in the top thereof to mount a dial or push button set therein. On the ends of the base 2 are semicup shaped depressions 6 and 3 into which the ends of the handset housing the receiver and transmitter nestle. One of the cup-shaped depressions 6, which is in this embodiment of the invention the depression into which the receiver nestles, has substantially vertical walls 26 while the walls 27 of the other depression 3 which holds the transmitter have a more gradual downward slope, the reason for the gradual slope of wall 27 being subsequently explained. In the sides of each depression are slits 4 which are there for the purpose of allowing the ringing signal to pass out thru the base 2. Screw holes 5 and 9 are located in the base 2 for mounting the base on the base mounting plate. Located on the walls of the depression 3 are small ledges 11, there being a ledge on either side of the depression near the end opening. Two shoulders or overhanging edges 10 extend out over the depression 6. A hole 7 thru which the hookswitch plunger or lever extends is located in the wall of the cup 6. The bottom or floor 28 of the depression 6 has a gradual slope downward toward the end opening but is divided by a raised section 8 which extends horizontally outward with no downward slope. An opening 12 is located at the bottom of the base to allow the passage of the telephone wires therethru.

The handset 19 which is designed to be carried by the base 2 is shown in detail in Figs. 11, 12, and 13. The form of the handset 19 is similar to those well known in the art. The transmitter and receiver elements (not shown) are housed in opposite ends of the handset, and for our purpose we may say that the receiver element is located under housing 21 and the transmitter element under housing 20. The housing 20 is convex in shape and the housing 21 is slightly concave, the surfaces of both being hard and smooth. The housing 21 is moulded so as to have a raised ring shaped section 29 girding it. Holes 30 and slots 31 in the housings 21 and 20 allow the speech to pass through.

Figure 1:
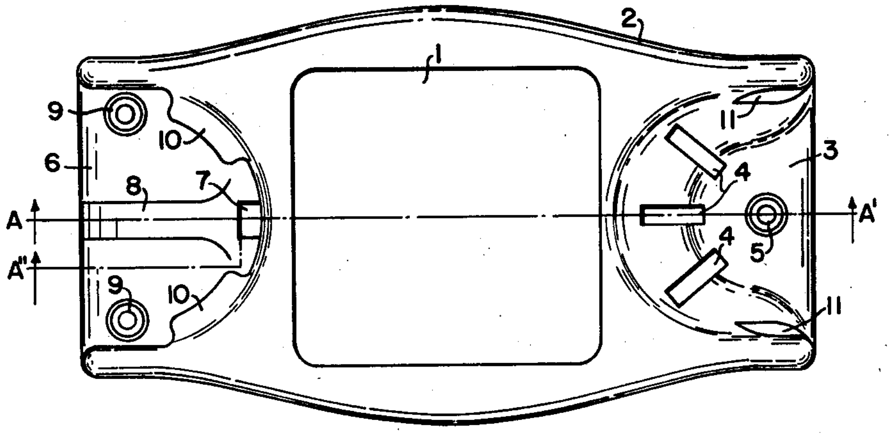
Figure 1 is a top view of the base of the telephone set.
Figure 2:
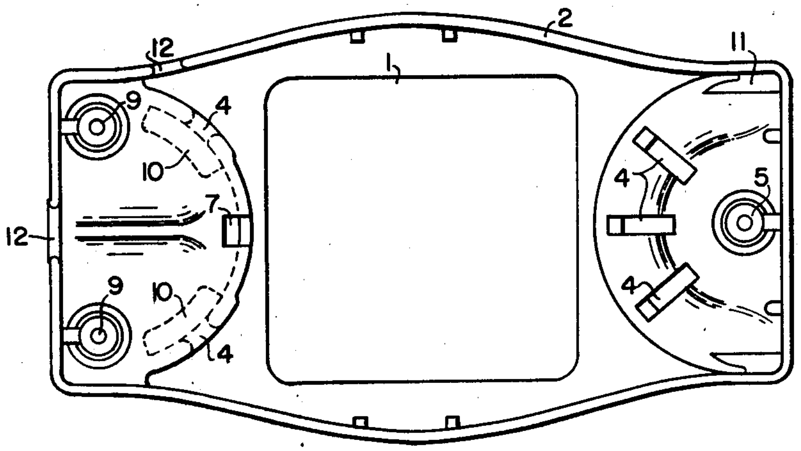
Fig. 2 is a bottom view of the base.
Figure 3:
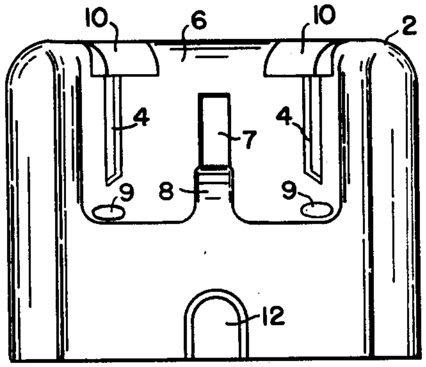
Fig. 3 is an end view of the base looking from the left in Fig. 1.
Figure 4:
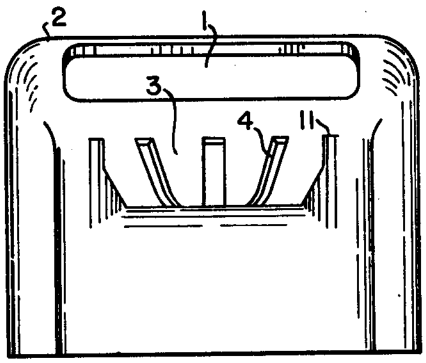
Fig. 4 is an end view of the base looking from the right in Fig. 1.
Figure 5:
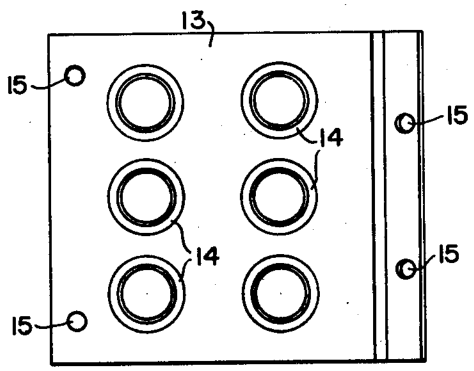
Fig. 5 is a top view of the push buttons and push button plate or panel that may be mounted in the base.
Figure 7:
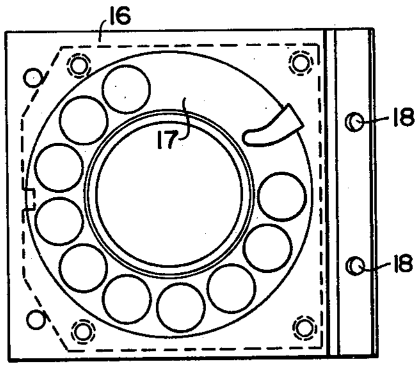
Fig. 7 is a top view of the dial and dial plate that may be mounted in the base in place of the push buttons.
Figure 6:
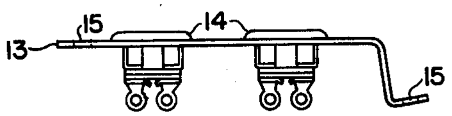
Fig. 6 is a side view of the push button plate with push buttons.
Figure 8:
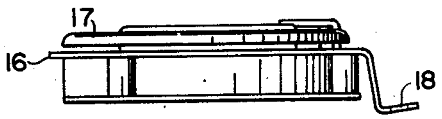
Fig. 8 is a side view of the dial and dial plate.
Figure 9:
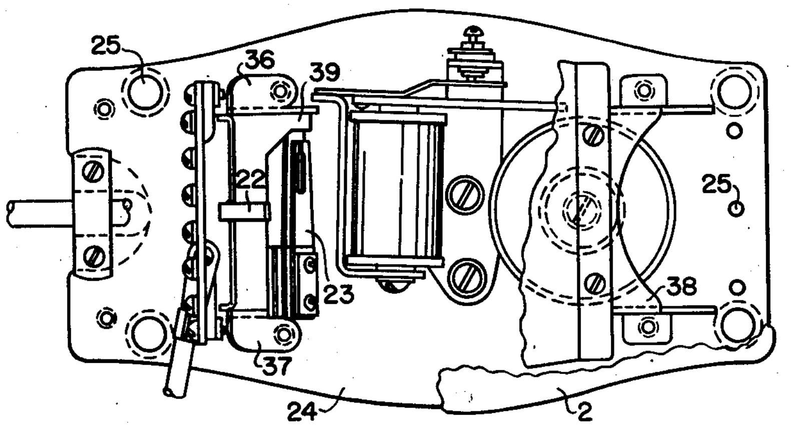
Fig. 9 is a view looking down on the base mounting plate on which the base shown in Fig. 1 is fixedly mounted by means of screws. Some of the telephone apparatus is shown mounted on the base plate.
Figure 10:
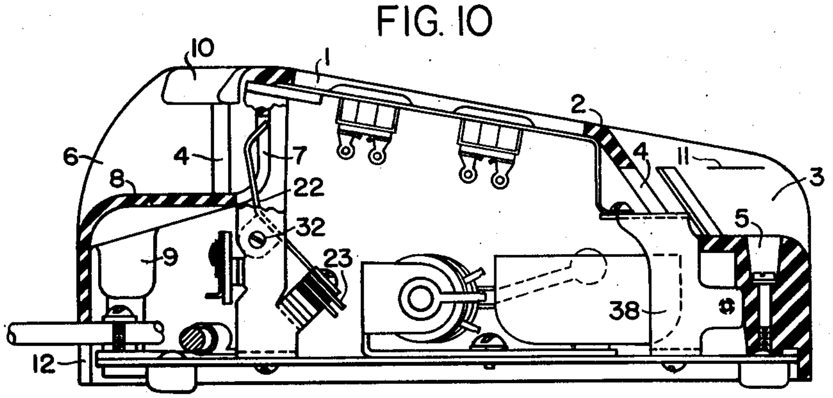
Fig. 10 shows the base mounting plate of Fig. 9 with a sectionalized view of the base of Fig. 1 mounted thereon.

Referring to Figs. 9 and 10, the mounting plate 24 on which base 2 mounts is shown along with some of the telephone apparatus mounted thereon. Tapped holes 25 are used to mount the base 2 on the base plate 24. A pair of brackets 36 and 37 are mounted on the plate 24 and extend upward. The hookswitch lever 22 is pivotally mounted between brackets 36 and 37 at point 32 and extends outwardly through the opening 7 in the base 2 where it may be engaged by the ring-shaped section of the housing 21. The hookswitch springs 23 engage the lever element 22 at point 39. The lever 22 is shown in the position it assumes when the handset 19 has been removed from the base 2, the spring tension of the hookswitch springs forcing the lever 22 out through the opening 7.

A third bracket 38, U-shaped and shorter in height than the brackets 36 and 37, is mounted at the other end of the plate, the three brackets being used to mount the push button or dial plates so that the upper surface of the base slants down from the receiver holding end to the transmitter holding end. Ringing apparatus comprising a bell is also shown mounted on the plate 24.

Figs. 5, 6, 7 and 8 show a push button plate 13 and a dial plate 16, either of which may be mounted on the base 2 through the opening 1 by means of screw holes 15 and 18. Fig. 10 shows the push button plate mounted on the brackets.

Referring now to Fig. 14, there are shown two positions of the handset 19 relative to the base 2. The dotted line shows the handset in a position that the user of the handset may place it immediately prior to releasing his hold on it. The solid line shows the handset in its final resting position on the base 2, the position which the handset has assumed due to the force of gravity and the interaction between the handset 19 and the base 2 after the user has released his hold on the handset 19. The exact position of the handset 19 shown by the dotted line is not the only position that the user may place it in just prior to releasing but this particular position has been shown merely for illustration. Referring now more particularly to the handset 19 in the dotted position, the handset is in contact with the base 2 in two spots, these being opposite points on the outer edge of the underside surface of the housing 21 and points on the outer edge of the floor surface of the depression 6, one on either side of the raised section 8. One of these particular points of contact has been indicated in Fig. 14 by the designation 33. The raised section 8 of the floor surface of the cup 6 fits into the concaved portion of the housing 21. The raised section 8 will prevent the handset 19 from sliding downward to the left to thereby prevent the housing 21 from sliding out of the cup 6 when the handset is released. When the handset is released, the end of the handset carrying housing 20 falls in an arc, the handset being pivoted at the points of contact 33 of the other end. As the handset 19 falls, the smooth surfaced edges 34 or 35 of the housing 20 come into contact with the smooth surfaced sloping walls 27 of the depression 3. The weight of the handset and the small coefficient of friction between the housing 20 and the sloping walls 27 cause the housing 20 to slide down the walls 27 and as it moves down it also moves to the right until finally the edge 35 comes into contact with the supporting ledges 11 and the handset comes to rest. As the housing 20 moves down the walls 27, the handset moves to the right on the base 2 and the raised ring 29 of housing 21 is caused to move under the shoulders 10 overhanging the cup 6. The left end of the handset 19 is thus locked onto the base 2 in that this end cannot be raised off the base 2 without first raising the right hand end. As the handset moved to the right due to the housing 20 sliding down the walls 27, it also caused the ring shaped section 29 of housing 21 to engage the switch spring lever 22 extending through the opening 7 and to move the lever 22 to the right so as to cause operation of the springs 23.

The particular telephone set shown can also be wall mounted in which case the base would be hung vertically with the end having the cup depression 6 at the top and with the end having the cup depression 3 at the bottom. The handset would fit onto the base in the same manner but it can be seen that the interaction of the smooth surfaced housing 20 and sloping walls 27 of the depression 3 would not be as instrumental in causing the handset to operate the hookswitch and lock onto the base as in the case of desk mounting.

Having described a preferred embodiment of the invention, it is to be understood that various modifications may be made therein, and the appended claims are intended to cover all such modifications as fall within the true spirit and scope of the invention.

What is claimed is:

1. In a combination desk and wall mounting telephone set, a handset including a transmitter housing and a receiver housing on opposite ends thereof, the transmitter housing being convex in shape and the receiver housing being concave, a raised ring-shaped section girding the periphery of said receiver housing, a base for holding said handset mountable in either a vertical or a horizontal position, said base having a slanting front or upper surface, said base having a partially cup-shaped opening therein at the higher end of said slanting surface for receiving and holding said receiver housing and a second partially cup-shaped opening therein at the lower end for receiving and holding said transmitter housing, said first opening having a slot in a section of the wall thereof near to said second opening, a switch, a lever for operating said switch protruding through said slot into said first opening, a raised ridge on the bottom surface of said first opening designed to fit into the concave space of the receiver housing, a lip on said base extending inward over said first opening near the upper edge thereof, said second opening having its walls slanting inward toward the bottom thereof, said slanting upper surface and said slanting walls of the base when in the horizontal position acting in co-operation with the convex surface of said transmitter housing due to the force of gravity when the handset is placed on said base to move said handset horizontally on said base to thereby draw said receiver housing into said first opening so as to cause said ring shaped section to engage said lever and to move under said lip.

2. In a desk mounted telephone set, a handset including a transmitter housing on one end thereof and a receiver housing on the other end thereof, one of said housings extending convexly from said handset, a raised ring-shaped section girding the periphery of said other housing, a base for holding said handset in a horizontal position having cup-shaped depressions therein into which said housings nestle when the handset is placed thereon, the walls of one of said cup-shaped depressions having a gradual inward slope, a pair of overhanging edges on said base extending over the other of said cup-shaped depressions, the handset and base being so constructed that when the handset is placed horizontally on the base with said other housing in said other cup-shaped depression in a position preparatory to releasing the handset, gravity will act, on release of the handset, to cause said one convex shaped housing to engage and slide along the sloped walls of said one cup-shaped depression to thus move downwardly and also horizontally, thus moving the ringed shaped section of the other housing under the overhanging edges which extend over the other cup-shaped depression to thereby cause the handset to lock onto the base.

3. In a desk mounted telephone set, a handset including a receiver housing on one end thereof and a transmitter housing on the other end, one of said housings being convex with respect to the handset, a ring-shaped section girding the periphery of the other housing, a base member for holding the handset when not in use having two cup-shaped depressions therein into which said housings fit, one of said depressions having smooth downwardly sloping walls, the other of said depressions having a hookswitch lever opening in the wall thereof, an overhanging edge on said base extending over said other cup-shaped depression, and a hookswitch lever which extends outwardly thru said opening when the handset is removed from said base, the handset and base being of such construction that when said other housing is placed in or near said other cup-shaped depression with the handset extending over the base preparatory to releasing the handset when placing it on the base, gravity acting on the handset causes the handset to drop on the base, said convex housing engaging said smooth sloping walls of said one depression and sliding therealong, thus causing said other housing to move in a horizontal direction in said other depression causing said ring-shaped section to slide under said overhanging edge to engage and move said hookswitch lever.

4. In a mounting for a handset telephone, a base containing the usual telephone instrumentalities, said base having a sloping flat upper surface, a partially cup-shaped opening in the upper end of said surface having a lip extending inward near the upper edge thereof and a hook switch operating element in the opening under said lip, a second partially cup-shaped opening at the lower end of said surface having its walls slanting inward toward the bottom thereof, said slanting walls of said second opening acting in cooperation with a convex surface on one of the ends of a handset when placed thereon, to draw the other end of the handset into said first cup-shaped opening under said lip and into engagement with said operating element.

5. In a handset telephone, a base plate for mounting the usual telephone instrument including a signal and a switch, a pair of brackets extending upward from the base plate, an operating element for the switch mounted for pivotal action between said brackets, another bracket, a second plate mounted on the upper ends of said brackets in an angular position relative to said base plate, a cover mounted on said base plate covering said instrument, said cover having a slanting upper surface parallel to said second plate and openings at both ends thereof for receiving the receiver and transmitter of the handset, the opening for receiving the receiver of the handset having an opening thru which said element projects, and the other opening having a curved side wall sloping away from said receiver opening, said curved side wall acting on a correspondingly curved and slanting surface of the transmitter unit, when the handset is placed on the cover with the receiver in said first opening, to move the handset horizontally along said cover to draw the receiver against said element.

6. In a combination desk and wall mounting telephone set, a handset including a transmitter housing and a receiver housing on opposite ends thereof, one of said housings being concave in shape, a raised ring-shaped section girding the periphery of said one housing, a base for holding said handset mountable in either a vertical or a horizontal position, said base having a partially cup-shaped opening therein at one end of said base for receiving and holding said one housing and a second partially cup-shaped opening thereing at the other end for receiving and holding said other housing, a raised ridge on the bottom surface of said first opening shaped to fit into the concave space of the one housing, a lip on said base extending inward over said first opening near the upper edge thereof, said second opening having its walls slanting inward toward the bottom thereof, said ridge acting in co-operation with the concave housing to hold said housing in said first opening when the handset is placed on said base, and said slanting walls of said second opening acting in co-operation with the surface of said other housing due to the force of gravity on the handset when placed on said base, when said base is mounted horizontally, to move said handset horizontally on said base to thereby draw said one housing into said first opening so as to cause said ring-shaped section to move under said lip.

THEODORE C. RIEBE.

REFERENCES CITED

The following references are of record in the file of this patent:

UNITED STATES PATENTS

| Number | Name | Date |
|---|---|---|
| 1,819,362 | Dunn | Aug. 18, 1931 |
| 1,971,499 | Obergfell | Aug. 28, 1934 |
| 1,981,649 | King | Nov. 20, 1934 |
| 2,375,681 | Obergfell | May 8, 1945 |
| 2,479,198 | Baker | Aug. 16, 1949 |
| 2,492,375 | Boswau et al. | Dec. 27, 1949 |